Nov. 19, 1940.  B. S. VILKOMERSON  2,222,196
RADIO RECEIVING SYSTEM
Filed May 22, 1939
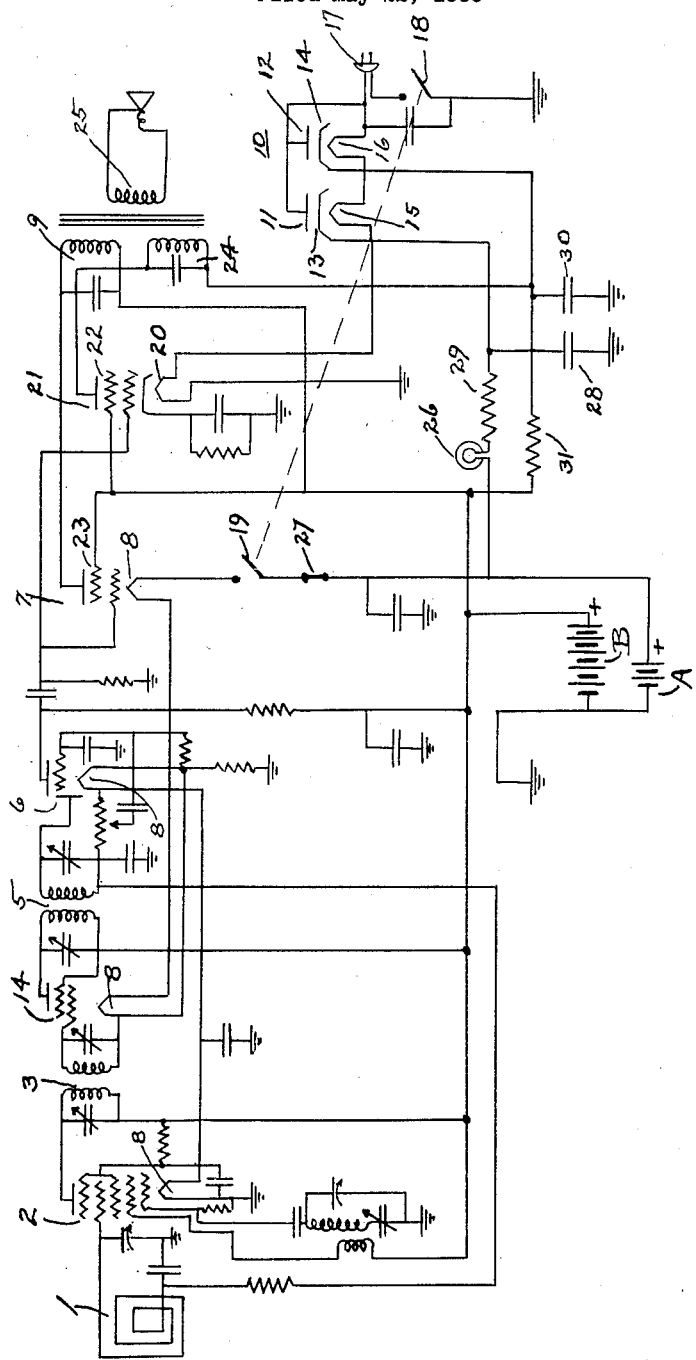
INVENTOR=
Benjamin S. Vilkomerson
BY George Woodworth
ATTORNEY=

Patented Nov. 19, 1940

2,222,196

UNITED STATES PATENT OFFICE 2,222,196

RADIO RECEIVING SYSTEM

Benjamin S. Vilkomerson, Boston, Mass., assignor to David Housman and Abraham J. Housman, both of Winthrop, Mass.

Application May 22, 1939, Serial No. 274,866

14 Claims. (Cl. 250—27)

This invention relates to radio receiving systems operable on dry batteries alone, or on alternating or direct current power lines, or on batteries and direct current power lines, or on batteries and alternating current power lines.

There is a substantial demand for portable radio receiving systems energized by self contained dry batteries, or either direct or alternating current delivered by power lines, and such systems are provided with somewhat elaborate switching arrangements whereby the energization of the set may be changed from batteries to power circuits. It is one of the objects of the present invention to provide a portable receiver operable from self contained dry "A", or filament, batteries, and "B", or plate, batteries, and also on direct or alternating current obtained from power lines without switches to change from battery to power operation.

If the receiver is not connected to a service system, it will operate from its batteries as soon as the control, or on-and-off switch, is closed, and if it is connected to such service system it will start immediately from its batteries when the control switch is closed, and after it has operated for a few seconds and the tubes become heated the operation is automatically changed from battery operation to power line operation, the batteries in such case being floating on the line and no longer supplying power. If the set is then disconnected from the power line, it will continue to operate from its batteries.

I have discovered that after a period of battery operation so prolonged as to reduce the strength of the batteries to the point where they will not operate effectively, the batteries can be rejuvenated and brought back to substantially full voltage by connecting the receiver to a power line and using it for some time so that the hours of service of the dry cells may be increased about 20%. If the receiver is connected to a service system and the control switch is closed at a time when the strength of the batteries, or either of them, is at, or has been reduced below, normal voltage, the operation will be by the power system only, either alternating current or direct current, and will so continue even after the batteries have been rejuvenated as above set out until the receiver is disconnected from the power system, whereupon the operation will continue on battery energization. In other words, if the batteries are in operative condition when the receiver is connected to a service system, the operation is automatically changed from battery operation to power line operation as soon as the tubes become heated, as above recited; but it is never changed from power line operation to battery operation, for the batteries, whenever they are at normal voltage while the set is connected to the power line, are merely floating on the line and neither absorb nor supply power.

Another object of my invention is to provide a receiver operable from either batteries or electric power lines with two output electron discharge devices, one being a battery operated device, and the other a power operated device, the latter having no effect on the operation of the set until the application of power line voltage, whereupon the power actuated output tube becomes energized with the result that the power developed in the loud speaker circuit is somewhat greater than that produced therein by the battery operated output circuit. In such case, there is employed a loud speaker coupling transformer having two primaries connected to the respective plate circuits of said battery and power operated output electron discharge devices, and said primaries are so designed as to match the impedance of the loud speaker voice coil to the optimum operating impedances of said output electron discharge devices, respectively. It will be observed that this feature of my invention is applicable to battery and power circuit systems of the type now existing, in which the mode of energization is changed by multi-contact switches.

With the foregoing objects in view, my invention comprises a radio receiver including a rectifier preferably of the hot cathode type and preferably having one anode and at least two cathodes, the cathodes being connected separately to the filament circuits of the tubes and to the plate circuits thereof, respectively, thereby eliminating the voltage divider heretofore necessarily employed for supplying the filament current and plate voltage from a single rectifier, and also the switch that necessarily is used therewith to change from battery to power circuit operation in order to avoid the exhaustion of the batteries when the set is not in operation.

My invention comprises also a receiver operable on alternating or direct current circuits in which there is employed a filter circuit so constructed and arranged as to equalize the current supplied to the filaments on direct and alternating current excitation at the same voltage and to equalize the potential applied to the plates on direct and alternating current excitation at the same voltage.

Various other objects of my invention and the means for effecting the same will hereinafter appear.

The drawing accompanying and forming a part of this specification is a diagrammatic representation of a superheterodyne radio receiver embodying my invention, although it will be understood, of course, that my invention is not limited to a receiver of this type and is capable of general application.

In the particular diagram selected for illustrating the principle underlying my invention, 1 is a loop antenna connected in the usual way to a mixer and oscillation tube 2, the output circuit of which is connected by transformer 3 to the intermediate frequency circuit having an amplifier tube 4. By means of the transformer 5, the amplifier circuit is connected to a detector and audio frequency amplifier tube 6, in the output circuit of which is a battery-operated power output tube 7.

By means of the "A" battery of 6 volts, the filaments 8 of the tubes above mentioned, which as shown are connected in series, are energized, and by means of the "B" battery the plates of said tubes are raised to the desired potential, which is 90 volts in the present instance, the path of the plate circuit of tube 7 including the primary 9 of the loud speaker coupling transformer.

The circuit so far described is an ordinary 4-tube, battery operated superheterodyne, with which are associated the usual adjuncts shown in the drawing and constituting no part of the present invention.

For power operation there is provided a rectifier 10, preferably of the hot cathode type, said rectifier having one anode, i. e., the two plates 11, 12, electrically connected, two cathodes 13, 14, and two heater elements 15, 16, the heater circuit of said rectifier being adapted for connection to an alternating current or direct current power line by the plug 17 or other suitable switch means.

One terminal of the filament dry battery A is permanently connected to the cathode 13, one terminal of the plate dry-battery B is permanently connected to the cathode 14; the anode 11, 12, and the cathode 13 are connected in series with said filament battery and an external source of power which may be either an alternating current power line or a direct current power line to which the rectifier is connected by the plug 17 without the interposition of a transformer or automatic switches, or any other devices whatever save only the usual on-and-off switch; and the anode 11, 12, and cathode 14 are connected in series with said plate battery and such external source without the interposition of any device except said on-and-off switch. Stated otherwise, one terminal of said filament battery is permanently connected to the cathode 13, one terminal of said plate battery is permanently connected to the cathode 14, means are provided for connecting the anode 11, 12, directly, and without the interposition of switches or other devices, to one side of the power line, and other means, including the usual on-and-off switch, are provided for connecting the other terminals of said filament and plate batteries, shown in the present instance as grounded, directly to the other side of said line, whereby, when the rectifier is connected to said external source of power said batteries if at normal voltage are floating on the respective rectifier output circuits and if partially exhausted will be rejuvenated or brought back to substantially full voltage by the direct current flowing through them from the rectifier output circuits, which direct current may be either the current from a direct current power line or a rectified alternating current, if said source is an alternating current power line. The control or on-and-off switch 18 is arranged on a shaft, indicated by the dash line, for simultaneous actuation with the A-battery control switch 19.

The system so far described is a complete superheterodyne radio receiver operable on the dry batteries alone, or on said batteries and direct current power, or on said batteries and alternating current power, which does not require switches of any sort to change from battery to power operation.

If the set is not connected to a power circuit by the plug 17, immediate operation on battery energization is obtained by the closure of the control switch 19, the simultaneous closure of the switch 18 being, of course, ineffective as the rectifier is not energized.

If the batteries were disconnected and the set plugged into an electric power circuit, the closure of the control switches would result in operation on power energization, either alternating or direct.

Assuming the batteries connected as shown, the rectifier circuit not connected to a source of electric power and the control switches closed, there will be, as above stated, operation on battery energization. If the set is now plugged into a power circuit, the heater 20 of the power line operated output tube 21, the control grid 22 of which is electrically connected to the control grid 23 of the tube 7, which heater is in series with the heaters 15 and 16, will be energized and the current of the plate circuit of the output tube 21 will pass through the primary 24 of the loud speaker coupling transformer having a secondary 25.

In this manner, the set is automatically converted without the use of the switches heretofore employed from battery to power operation.

It will be noted that when operating on batteries alone the power line operated output tube 21 is ineffective, and that after the energization of the rectifier the battery operated output tube 7 is relatively ineffective compared to the tube 21, for the maximum output of its plate circuit is only about 100 milliwatts while that of said tube 21 is about 2.1 watts. This feature of my invention, that is to say, the combination of the battery operated output tube 7 and the power line operated output tube 21 having their control grids electrically connected together with the battery supply and rectifier, is useful in the now existing sets in which switches must be employed to change over from battery to power operation.

In the system shown in the diagram in which, of course, no such switches are employed, it will be obvious that when the plug 17 is connected to a power line the batteries which are floating on the respective rectifier output circuits supply no power to the tubes, and that the energization of the latter is due entirely to the rectifier. If now the set be disconnected from the power line, it will continue to operate from the batteries. Serially connected with one of the cathodes 13, 14, is an electrically operated visual indicator 26, herein shown as an electric lamp, which is energized only during power operation. If, during the operation of the set on battery power, the plug 17 is connected to an alternating current circuit, the visual indicator 26 will be actuated as soon as the power operation of the set begins provided, of course, the plug socket is not defective or inoperative. The failure of the lamp 26 to light will at once tell the user that the set is still operating on the batteries on account of a defect in the plug 17 or its socket, or else the failure of the power circuit. If the set is plugged into a direct current circuit, after the control switches are closed and the set is operating on the batteries, the failure of the lamp 26 to light will indicate that the plug has been inserted in its socket in such way that the wrong terminal of the power line is connected to the anode, and in such case the plug should be withdrawn, rotated 180°, and reinserted, whereupon, assuming no plug or socket defect or power line failure, the visual indicator will be actuated.

I have proven by exhaustive tests that dry batteries, the output of which has been greatly reduced by use, can be rejuvenated and brought back to full voltage by passing direct current through them. This discovery makes possible a substantial increase in the hours of service of dry cells in systems of the kind herein described. For example, if the set has been used on battery operation to such an extent that the battery output is ineffective to operate the tubes and the set is then plugged into a power circuit, that portion of the rectified current passing through the batteries, which as aforesaid are in series with the respective rectifier output circuits, will restore the batteries to such extent that the set will operate for a while on batteries alone. The length of time required for such restoration depends, of course, upon the degree of exhaustion of the batteries, and the greater the period of power actuation, the greater the extent of battery rejuvenation.

If an additional filament switch 27 be supplied, and opened upon the closure of the control switches the entire output of the rectifier will pass through the batteries and a greater degree of battery restoration will be obtained than when only a part of the rectifier output passes through said batteries, as is the case when the filament circuit is closed, and will be obtained in a much shorter time.

The primary 9 of the loud speaker coupling transformer is so designed that its net impedance matches the impedance of the loud speaker voice coil to the optimum impedance of the power output electron discharge device 7, and the secondary 24 of said transformer is so designed that its net impedance matches the impedance of the loud speaker voice coil to the optimum operating impedance of the power line operated output electron discharge device 21.

As the system is designed for actuation by direct current and alternating current power lines, it is desirable that matters be so arranged that the filament heater current passed through the filaments 8 by the anode 11 and cathode 13, when the rectifier is energized by alternating current of a given voltage, be equal to that developed when it is energized by a direct current of the same voltage, and, in like manner, it is desirable that the voltage impressed on the two plates by the anode 12 and the cathode 14, when the rectifier is energized by alternating current of a given voltage, be the same as when it is energized by direct current of said voltage. To effect this result, the filter system, comprising the capacitor 28 and resistor 29, is designed and proportioned to equalize the current supplied the filaments 8 on direct and alternating current excitation of the same voltage, and that the filter system, comprising the capacitor 30 and resistor 31, is designed to equalize the potential supplied to the plates of the tubes 2, 4, 6, and 7, on direct and alternating current excitation of the same voltage. In the present instance, I find that these results may be effected if the resistor 29 has a value of 2100 ohms, the resistor 31, 1600 ohms, and the capacitors 28, 30, each has a capacitance of 10 microfarads.

Having thus described an illustrative embodiment of my invention without, however, limiting the same thereto, what I claim and desire to secure by Letters Patent is:

1. A radio receiving system operable either from batteries or an alternating current or direct current electric power line, comprising in combination a plurality of circuits in cascade, each circuit having an electron discharge device comprising a filament and a plate, a filament dry-battery, means connecting said filament battery to pass current through the filaments of said electron discharge devices, a plate dry-battery, means connecting said plate battery to the plates of said electron discharge devices, a power rectifier having an anode and two cathodes, means permanently connecting one terminal of said filament battery to one of said cathodes, means permanently connecting one terminal of said plate battery to the other of said cathodes, means for connecting said anode and one of said cathodes in series with said filament battery and an alternating current or direct current power line, and means for connecting said anode and the other of said cathodes in series with said plate battery and said power line, whereby when said rectifier is connected to said power line, said batteries if at normal voltage are floating on the respective rectifier output circuits and if partially exhausted will be rejuvenated or brought back to substantially full voltage by the direct current flowing though the same from said rectifier output circuits.

2. A radio receiving system operable either from batteries or an alternating current or direct current electric power line, comprising in combination a plurality of circuits in cascade, each circuit having an electron discharge device comprising a filament and a plate, means connecting the filaments of said electron discharge devices in series, a filament dry-battery, means connecting said filament battery to pass current through the serially-connected filaments of said electron discharge devices, a circuit opening and closing switch in circuit with said serially connected filaments, a plate dry-battery, means connecting said plate battery to the plates of said electron discharge devices, a power rectifier having an anode and two cathodes, means permanently connecting one terminal of said filament battery to one of said cathodes, means permanently connecting one terminal of said plate battery to the other of said cathodes, means for connecting said anode directly to one side of an alternating current or direct current power line, and means for connecting the other terminals of said filament and plate batteries, respectively, directly to the other side of said power line, whereby when said rectifier is connected to said power line said batteries if at normal voltage are floating on the respective rectifier output circuits and if partially exhausted will be rejuvenated or brought back to substantially full voltage by the direct current flowing through the same from said rectifier output circuits.

3. A radio receiving system operable either from batteries or an alternating current or direct current electric power line, comprising in combination a plurality of circuits in cascade, each circuit having an electron discharge device comprising a filament and a plate, the last circuit of the series including a battery operated output electron discharge device having a control grid and a plate, a power rectifier having an anode and two cathodes, means permanently connecting one terminal of said filament battery to one of said cathodes, means permanently connecting one terminal of said plate battery to the other of said cathodes, means for connecting said anode and one of said cathodes in series with said filament battery and an alternating current or direct current power line, means for connecting said anode and the other of said cathodes in series with said plate battery and said power line, whereby when said rectifier is connected to said power line said batteries are floating on the respective rectifier output circuits and if partially exhausted will be rejuvenated or brought back to substantially full voltage by the direct current flowing through the same from said rectifier output circuits, means connecting said filament battery to pass current through the filaments of said electron discharge devices, means connecting said plate battery to the plates of said electron discharge devices, a power line operated output electron discharge device comprising a control grid, a cathode and a plate, means electrically connecting the control grids of said output electron discharge devices, means connecting one of said cathodes to the plate of the power line operated electron discharge device, means for heating the cathode of the power line operated electron discharge device, a lound-speaker coupling-transformer having two primaries, and means connecting said primaries to the respective plate circuits of said output electron discharge devices.

4. A radio receiving system operable either from batteries or an alternating current or direct current electric power line, comprising in combination a plurality of circuits in cascade, each circuit having an electron discharge device comprising a filament and a plate, the last circuit of the series including a battery operated output electron discharge device comprising a control grid and a plate, a power rectifier having an anode, two cathodes, and cathode-heating means, means for connecting said anode directly to one side of an alternating current or direct current power line, a filament dry-battery having one terminal connected to one of said cathodes, a plate dry-battery having one terminal connected to the other of said cathodes, means for connecting the other terminals of said filament and plate batteries, respectively, directly to the other side of said power line, means connecting said filament battery to pass current through the filaments of said electron discharge devices, means connecting said plate battery to the plates of said electron discharge devices, a power line operated output electron discharge device comprising a control grid, a cathode and a plate, means electrically connecting the control grids of said output electron discharge devices, means connecting one of said cathodes to the plate of the power line operated electron discharge device, means for connecting the cathode-heating means of said rectifier and the cathode of the power line operated electron discharge device to said power line, a loud-speaker coupling-transformer having two primaries, and means connecting said primaries to the respective plate circuits of said output electron discharge devices.

5. A radio receiving system operable either from batteries or an alternating current or direct current electric power line, comprising in combination a plurality of circuits in cascade, each circuit having an electron discharge device comprising a filament and a plate, the last circuit of the series including a battery operated output electron discharge device comprising a control grid and a plate, a power rectifier having an anode and two cathodes, a filament dry-battery connected to one of said cathodes, a plate dry-battery connected to the other of said cathodes, means for connecting said anode and one of said cathodes in series with said filament battery and an alternating current or direct current power line, means for connecting said anode and the other of said cathodes in series with said plate battery and said power line, means connecting said filament battery to pass current through the filaments of said electron discharge devices, means connecting said plate battery to the plates of said electron discharge devices, a power line operated output electron discharge device comprising a control grid, a cathode and a plate, means electrically connecting the control grids of said output electron discharge devices, means connecting one of said cathodes to the plates of all of said electron discharge devices, means connecting the other of said cathodes and said anode to pass current through the filaments of all of said electron discharge devices except said power line operated electron discharge device, means for heating the cathode of said power line operated electron discharge device, a loud-speaker coupling-transformer having two primaries, and means connecting said primaries to the respective plate circuits of said output electron discharge devices.

6. A radio receiving system operable either from batteries or an alternating current or direct current electric power line, comprising in combination a plurality of circuits in cascade, each circuit having an electron discharge device comprising a filament and a plate, the last circuit of the series including a battery operated electron discharge device comprising a control grid and a plate, a power rectifier, a power line operated output electron discharge device comprising a control grid, a cathode and a plate, means electrically connecting the control grids of said output electron discharge devices, means connecting said rectifier to the plate of the power line operated output electron discharge device, means for heating the cathode of said power line operated electron discharge device, a loud-speaker coupling-transformer having two primaries, and means connecting said primaries to the respective plate of circuits of said power output electron discharge devices.

7. In a radio receiving system operable either from batteries or an alternating current or direct current electric power line, a battery-operated output electron discharge device comprising a control grid, a filament and a plate, a power line operated output electron discharge device comprising a control grid, a cathode and a plate, means electrically connecting the control grids of said electron discharge devices, a filament battery connected to energize the filament of said battery operated electron discharge device, a plate battery connected to the plate of said battery operated electron discharge device, a rectifier having two output circuits, means connecting one of such output circuits to the respective plates of said electron discharge devices and in series with said plate battery, means connecting the other of said output circuits in series with the filament of said battery operated electron discharge device and in series with said filament battery, and means for connecting said rectifier to an alternating current or direct current power line.

8. In a radio receiving system operable either from batteries or alternating current or direct current electric power line, a battery operated output electron discharge device comprising a filament and plate, a power line operated electron discharge device comprising a cathode and plate, means electrically associating said power line operated output electron discharge device and said battery operated output electron discharge device, a filament battery connected to energize the filament of said battery operated electron discharge device, a plate battery connected to the plate of said battery operated electron discharge device, a rectifier having two output circuits, means connecting one of such output circuits to the respective plates of said electron discharge devices and in series with said plate battery, means connecting the other of said output circuits in series with the filament of said battery operated electron discharge device and in series with said filament battery, and means connecting said rectifier to an alternating current or direct current power line.

9. In a radio receiving system operable either from batteries or alternating current or direct current electric power line, a battery operated output electron discharge device comprising a filament and plate, power line operated electron discharge device comprising a cathode and plate, means electrically associating said power line operated output electron discharge device and said battery operated output electron discharge device, a filament battery connected to energize the filament of said battery operated electron discharge device, a plate battery connected to the plate of said battery operated electron discharge device, a rectifier, means connecting said rectifier to the respective plates of said electron discharge devices and in series with said plate battery, means connecting said rectifier in series with the filament of said battery operated electron discharge device and in series with said filament battery, and means connecting said rectifier to an alternating current or direct current power line.

10. A radio receiving system operable either from batteries or an alternating current or direct current electric power line, comprising in combination a series of circuits in cascade, each circuit having a battery operated electron discharge device comprising a filament and a plate, a power line operated electron discharge device electrically associated with the last circuit of said series, said power line operated electron discharge device comprising a cathode and a plate, a rectifier having a filament-output circuit and a plate-output circuit, means for connecting said rectifier to an alternating current or direct current power line, means connecting said rectifier filament-output circuit to pass current through each of the filaments of said battery operated electron discharge devices, a filament battery, means connecting said filament battery in series with said rectifier filament-output circuit and in series with said filaments, means connecting said rectifier plate-output circuit to the plates of said battery operated electron discharge devices and to the plate of said power line operated electron discharge device, a plate battery, means connecting said plate battery in series with said rectifier plate-output circuit and to the plates of said battery operated electron discharge devices and the plate of said power line operated electron discharge device, and means for heating the cathode of said power line operated electron discharge device.

11. A radio receiving system operable either from batteries or an alternating current or direct current electric power line, comprising in combination a plurality of circuits in cascade, each circuit having an electron discharge device comprising a filament and a plate, the last circuit of the series including a battery operated electron discharge device comprising a filament and a plate, a filament battery, means connecting said battery to pass current through the filaments of said electron discharge devices and the filament of said battery operated output electron discharge device, a plate battery, means connecting said plate battery to the plates of said electron discharge devices and to the plate of said battery operated output electron discharge device, a power rectifier, means for connecting said rectifier to an external source of power, a power line operated output electron discharge device comprising a cathode and a plate, means electrically associating said output electron discharge devices, means connecting said rectifier to the plate of said power line operated electron discharge device, means for heating the cathode of said power line operated electron discharge device, a loud-speaker coupling-transformer having two primaries and means connecting said primaries to the respective plate circuits, the net impedance of one of said primaries matching the impedance of the loud-speaker voice coil to the optimum operating impedance of the battery operated output electron discharge device, and the net impedance of the other of said primaries matching the impedance of the loud-speaker voice coil to the optimum operating impedance of said power line operated output electron discharge device.

12. A radio receiving system operable either from batteries or an alternating current or direct current electric power line, comprising in combination a plurality of circuits in cascade, each circuit having an electron discharge device comprising a filament and a plate, a filament dry-battery, means connecting said filament battery to pass current through the filaments of said electron discharge devices, a circuit opening and closing switch controlling the flow of current through said filaments, a plate dry-battery, means connecting said plate battery to the plates of said electron discharge devices, a power rectifier having an anode and two cathodes, means permanently connecting one terminal of said filament battery to one of said cathodes, means permanently connecting one terminal of said plate battery to the other of said cathodes, means connecting said anode and one of said cathodes in series with said filament battery and an alternating current or direct current power line, and means connecting said anode and the other of said cathodes in series with said plate battery and said power line, whereby when said rectifier is connected to said power line said batteries if at normal voltage are floating on the respective rectifier output circuits and if partially exhausted will be rejuvenated or brought back to substantially full voltage by the direct current flowing through the same from said rectifier output circuits.

13. A radio receiving system operable either from batteries or an alternating current or direct current electric power line, comprising in combination a plurality of circuits in cascade, each circuit having an electron discharge device comprising a filament and a plate, a filament dry-battery, means connecting said filament battery to pass current through the filaments of said electron discharge devices, a plate dry-battery, means connecting said plate battery to the plates of said electron discharge devices, a rectifier, means connecting said rectifier to the respective plates of said electron discharge devices and in series with said plate battery, means for connecting said rectifier to pass current through the filaments of said electron discharge devices and in series with said filament battery, and means for connecting said rectifier to an alternating current or direct current power line.

14. In a radio circuit, a multi-stage vacuum tube amplifier, a first power output vacuum tube, each of said vacuum tubes having an open filamentary cathode and an anode, a vacuum tube rectifier having a heater, a second power output vacuum tube having a heater, circuits for energizing the cathodes of the amplifier vacuum tubes from said rectifier and the heater of said second power output tube and for supplying operating potentials to said anodes, means for energizing said circuits from a direct or alternating current house lighting circuit, a battery current source, and circuits including said battery source for energizing the cathodes of said amplifier and first power output tube and supplying operating potentials for the anodes thereof.

BENJAMIN S. VILKOMERSON.